(12) United States Patent
Kurematsu

(10) Patent No.: US 6,923,546 B2
(45) Date of Patent: Aug. 2, 2005

(54) PROJECTION OPTICAL SYSTEM AND PROJECTION TYPE DISPLAY APPARATUS USING THE SAME

(75) Inventor: Katsumi Kurematsu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/043,944

(22) Filed: Jan. 10, 2002

(65) Prior Publication Data
US 2002/0105621 A1 Aug. 8, 2002

(30) Foreign Application Priority Data

Jan. 12, 2001 (JP) ........................................ 2001-005307

(51) Int. Cl.⁷ .................. G03B 21/26; G03B 21/14; G02B 9/00; G02B 9/08
(52) U.S. Cl. .................. 353/97; 353/30; 359/739
(58) Field of Search .................. 353/30, 97; 349/5, 349/9; 359/738–739

(56) References Cited

U.S. PATENT DOCUMENTS

| 3,121,798 | A | * | 2/1964 | Ploke | 250/229 |
|---|---|---|---|---|---|
| 5,379,083 | A | * | 1/1995 | Tomita | 353/122 |
| 5,597,223 | A | * | 1/1997 | Watanabe et al. | 353/97 |
| 5,798,805 | A | * | 8/1998 | Ooi et al. | 349/10 |
| 6,017,123 | A | * | 1/2000 | Bleha et al. | 353/30 |
| 6,592,227 | B2 | * | 7/2003 | Ouchi et al. | 353/97 |
| 6,637,887 | B2 | * | 10/2003 | Yamanaka | 353/30 |
| 6,683,657 | B1 | * | 1/2004 | Miyawaki | 348/743 |
| 2002/0044261 | A1 | * | 4/2002 | Ouchi et al. | |

FOREIGN PATENT DOCUMENTS

JP 04291333 A * 10/1992 ........... G03B/21/00

OTHER PUBLICATIONS

McGraw–Hill Dictionary of Physics and Mathematics, McGraw–Hill, Inc., 1978, p. 867.*

* cited by examiner

Primary Examiner—Rodney Fuller
Assistant Examiner—Magda Cruz
(74) Attorney, Agent, or Firm—Morgan & Finnegan, L.L.P.

(57) ABSTRACT

A projection type image display apparatus which keeps the uniformity of brightness and the feeling of sharpness and yet achieves a high quality of image called a high dynamic range is provided. When the amount of projection light is made small, the projection of unnecessary leak light or scattered light from a light modulating element P from a projection optical system PL1 is suppressed and a firm black display is provided. The amount of projection light is controlled in conformity with the maximum luminance level of an input image signal. Also, the write signal of the light modulating element is modulated in conformity with the control of the amount of projection light, whereby it becomes possible to expand the display dynamic range while compensating for the display luminance level.

9 Claims, 5 Drawing Sheets

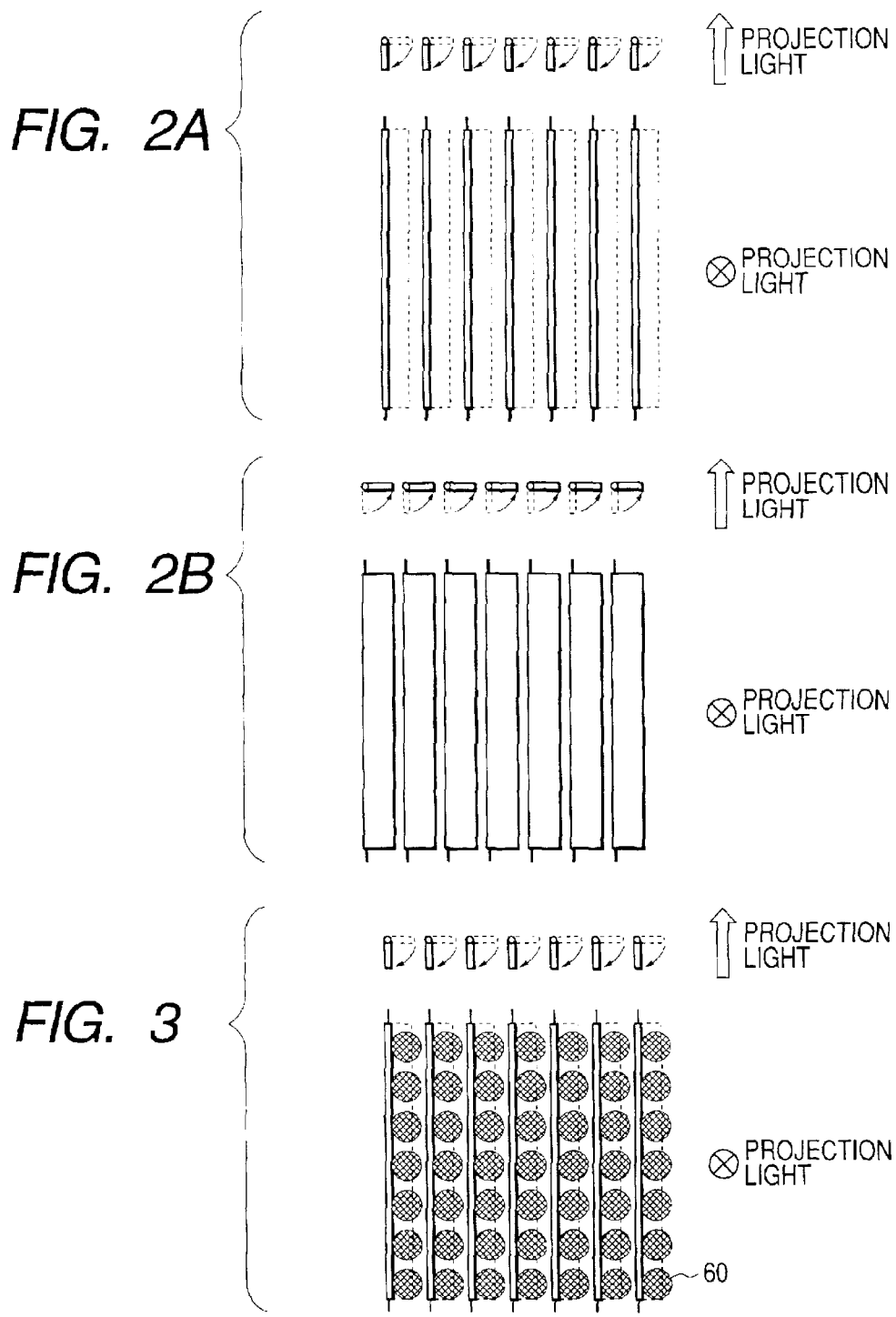

PROJECTION OPTICAL SYSTEM AND PROJECTION TYPE DISPLAY APPARATUS USING THE SAME

BACKGROUND OF THE INVENTION

1. Field of the Invention

This invention relates to a projection type image display apparatus.

2. Related Background Art

With the arrival of the multimedia age, image display apparatuses are used in all scenes. Particularly, a projection type image display apparatus is easy to widen its image plane and therefore, front projectors have spread for presentation use, etc. and rear projectors have spread for home theater use, etc.

CRT's have heretofore been utilized as the light modulating elements of these projectors. In recent years, however, with the requirements for higher luminance and higher resolution, as light modulating elements suitable for these requirements, the utilization of liquid crystal panels and DMD's (digital mirror devices, see, for example, Japanese Patent Application Laid-Open No. 10-78550) is becoming the mainstream. A projection type image display apparatus utilizing the liquid crystal panel or the DMD illuminates the liquid crystal panel or the DMD as the light modulating element with light from a light source, and forms transmitted light or reflected light from the liquid crystal panel or the DMD into an image on a screen through a projection optical system.

Now, the projection type image display apparatus has not yet reached the quality of image of a direct view type CRT image display apparatus in high image quality display (display of which a feeling of quality is required). The high image quality (feeling of quality) referred to herein refers to a high dynamic range (high contrast and high gradation display). The direct view type CRT image display apparatus realizes a dynamic range of at least 10000:1 when it displays the entire image plane in black and white. On the other hand, the dynamic range of the projection type image display apparatus is determined chiefly by the characteristic of the light modulating element, and is about 300 to 400:1 in the case of the liquid crystal panel, and about 600 to 800:1 in the case of the DMD. This lowness of the dynamic range is attributable to the fact that in black display, in the case of a transmission type liquid crystal panel, leak light, and in the case of a reflection type liquid crystal panel or the DMD, scattered light is projected and a dark state floats.

So, in a projection type image display apparatus using a scattering type liquid crystal panel disclosed in Japanese Patent Application Laid-Open No. 7-84553, a large aperture diameter and a small aperture diameter are prepared in the stop of a projection optical system, and they are changed over in conformity with the kind of an input image to thereby make display improved in dynamic range possible.

However, the example shown in Japanese Patent Application Laid-Open No. 7-84553 suffers from the problem that the display improved in dynamic range is made possible, but luminance is lowered and the feeling of sharpness lacks.

Also, there has been actualized the problem that by the aperture diameter being made small, the brightness distribution of a projected image is varied (usually the marginal portion becomes relatively dark).

SUMMARY OF THE INVENTION

So, the present invention has as its object to provide a projection type image display apparatus keeping the uniformity of brightness and the feeling of sharpness and yet achieving a high image quality called a high dynamic range.

In one aspect of the invention, a projection type display apparatus includes a projection optical system for projecting image light from a display device, and the projection optical system has light amount adjusting means capable of substantially uniformly attenuating the image light in the cross-section thereof.

In further aspect of the foregoing projection type display apparatus, the light amount adjusting means has a variable stop comprising a plurality of tiltable light intercepting plates arranged in the cross-section.

In further aspect of the foregoing projection type display apparatus, the light amount adjusting means has a variable stop comprising a plurality of displaceable light intercepting plates arranged in the cross-section.

In further aspect of the foregoing projection type display apparatus, the light amount adjusting means has ND filter means variable in transmittance.

In further aspect of the foregoing projection type display apparatus, the light amount adjusting means has a stop variable in aperture diameter.

In further aspect of the foregoing projection type display apparatus, a write signal to the display device is modulated in synchronism with the adjustment of the amount of light by the light amount adjusting means so that the dynamic range about luminance may change.

In further aspect of the foregoing projection type display apparatus, the display device includes a light modulating element and illuminating means for illuminating the light modulating element with light from a light source, and the illuminating means has a first optical system for forming a plurality of light source images by the light from the light source, and a second optical system for superimposing the beams from the plurality of light source images on the light modulating element, and the light amount adjusting means is disposed at a position whereat the plurality of light source images are projected.

In another aspect of the invention, a projection type display apparatus includes:

a projection optical system for projecting image light from a display device;

light amount adjusting means for adjusting the amount of the image light; and control means for attenuating the amount of light of the whole of the image light by the light amount adjusting means and modulating a write signal to the display apparatus so that the dynamic range about luminance may be expanded.

In further aspect of the foregoing projection type display apparatus, the light amount adjusting means substantially uniformly attenuates the image light in the cross-section thereof.

In further aspect of the foregoing projection type display apparatus, the light amount adjusting means has a variable stop comprising a plurality of tiltable light intercepting plates arranged in the cross-section.

In further aspect of the foregoing projection type display apparatus, the light amount adjusting means has a variable stop comprising a plurality of displaceable light intercepting plates arranged in the cross-section.

In further aspect of the foregoing projection type display apparatus, the light amount adjusting means has ND filter means variable in transmittance.

In further aspect of the foregoing projection type display apparatus, the light amount adjusting means has a stop variable in aperture diameter.

In further aspect of the foregoing projection type display apparatus, the projection optical system has the light amount adjusting means.

In further aspect of the foregoing projection type display apparatus, the display device includes a light modulating element driven in conformity with the write signal, and illuminating means for illuminating the light modulating element with light from a light source, and the illuminating means has a first optical system for forming a plurality of light source images by the light from the light source, and a second optical system for superimposing beams from the plurality of light source images on the light modulating element, and the light amount adjusting means is disposed at a position whereat the plurality of light source images are projected.

In further aspect of the foregoing projection type display apparatus, the illuminating means has the light amount adjusting means.

In further aspect of the foregoing projection type display apparatus, the projection optical system has the light amount adjusting means.

In another aspect of the invention, a projection type display apparatus includes:

a light modulating element for controlling the transmitted or reflected state of light to thereby display a gradation image;

an illuminating device for applying light to the light modulating element;

a projection optical system for projecting the transmitted light or reflected light of the light applied to the light modulating element;

write signal processing means for modulation-processing a write signal to the light modulating element;

projection light amount control means for controlling the amount of light in the optical path between the optical type integrator of the illuminating apparatus to the projection optical system; and control signal generating means for controlling the write signal processing means and the projection light amount control means;

wherein the control signal generating means generates a control signal on the basis of the luminance level of an input image signal so as to make the amount of projection light great and the modulation of the write signal small when the luminance level is high, and to make the amount of projection light small and the modulation of the write signal great when the luminance level is low.

In further aspect of the foregoing projection type display apparatus, the projection light amount control means adjusts the amount of light in the optical path between the illuminating device to the light modulating element and/or between the light modulating element to the projection optical system.

In further aspect of the foregoing projection type display apparatus, the projection light amount control means uniformly intercepts a light source image formed by the optical type integrator.

In further aspect of the foregoing projection type display apparatus, the projection optical system is a so-called schlieren optics.

In further aspect of the foregoing projection type display apparatus, the projection light amount control means has movable stop means and stop driving means.

In further aspect of the foregoing projection type display apparatus, the projection light amount control means is disposed at a position which is not in conjugate relationship with the light modulating element.

In further aspect of the foregoing projection type display apparatus, the projection light amount control means controls the amount of stop in conformity with the luminance level of the input image signal.

In further aspect of the foregoing projection type display apparatus, the movable stop means of the projection light amount control means is a stripe stop, and the driving means is a cam motor or an ultrasonic motor.

By "stripe stop" is here meant a stop that has a plurality of light intercepting portions arranged in one direction with a given interval.

In further aspect of the foregoing projection type display apparatus, the control signal generating means has luminance level calculation means for calculating the luminance level of the input image signal, and projection light amount calculation means for calculating the amount of projection light emerging from the projection optical system in conformity with the calculated luminance level, and generates the control signal of the projection light amount control means on the basis of the amount of projection light calculated in the projection light amount calculation means, and generates the control signal of the write signal processing means on the basis of the luminance level calculated in the luminance level calculation means and the calculated amount of projection light.

In further aspect of the foregoing projection type display apparatus, the luminance level calculation means calculates the maximum value of the luminance signal of each pixel in each field or each frame of an image signal as maximum luminance.

In further aspect of the foregoing projection type display apparatus, the luminance level calculation means calculates the cumulative histogram of the luminance signal of each pixel in each field or each frame of an image signal, and calculates a luminance level at which the cumulative histogram becomes constant or greater as maximum luminance.

In further aspect of the foregoing projection type display apparatus, the write signal processing means modulates the write signal so as to amplify it at an amplification factor substantially inversely proportional to the amount of projection light.

In further aspect of the foregoing projection type display apparatus, the light amount control means is disposed at the pupil position of the projection optical system.

In another aspect of the invention, a projection type display apparatus includes:

a projection optical system for projecting an image onto a screen; and light amount control means for uniformly intercepting a light source image projected onto the pupil of the projection optical system.

In another aspect of the invention, a projection optical system for projecting image light, the projection optical system having light amount adjusting means capable of substantially uniformly attenuating the image light in the cross-section thereof.

In further aspect of the foregoing projection type display apparatus, the light amount adjusting means has a variable stop comprising a plurality of tiltable light intercepting plates arranged in the cross-section.

In further aspect of the foregoing projection type display apparatus, the light amount adjusting means has a variable stop comprising a plurality of displaceable light intercepting plates arranged in the cross-section.

In further aspect of the foregoing projection type display apparatus, the light amount adjusting means has ND filter means variable in transmittance.

In further aspect of the foregoing projection type display apparatus, the light amount adjusting means has a stop variable in aperture diameter.

BRIEF DESCRIPTION OF THE DRAWINGS

FIGS. 2A and 2B show the structure of a stripe stop according to the embodiment of the present invention.

FIG. 3 shows the layout relationship between the stripe stop according to the embodiment of the present invention and a light source image.

DESCRIPTION OF THE PREFERRED EMBODIMENT

An embodiment of the present invention will hereinafter be described with reference to FIG. 1.

Figure 1:
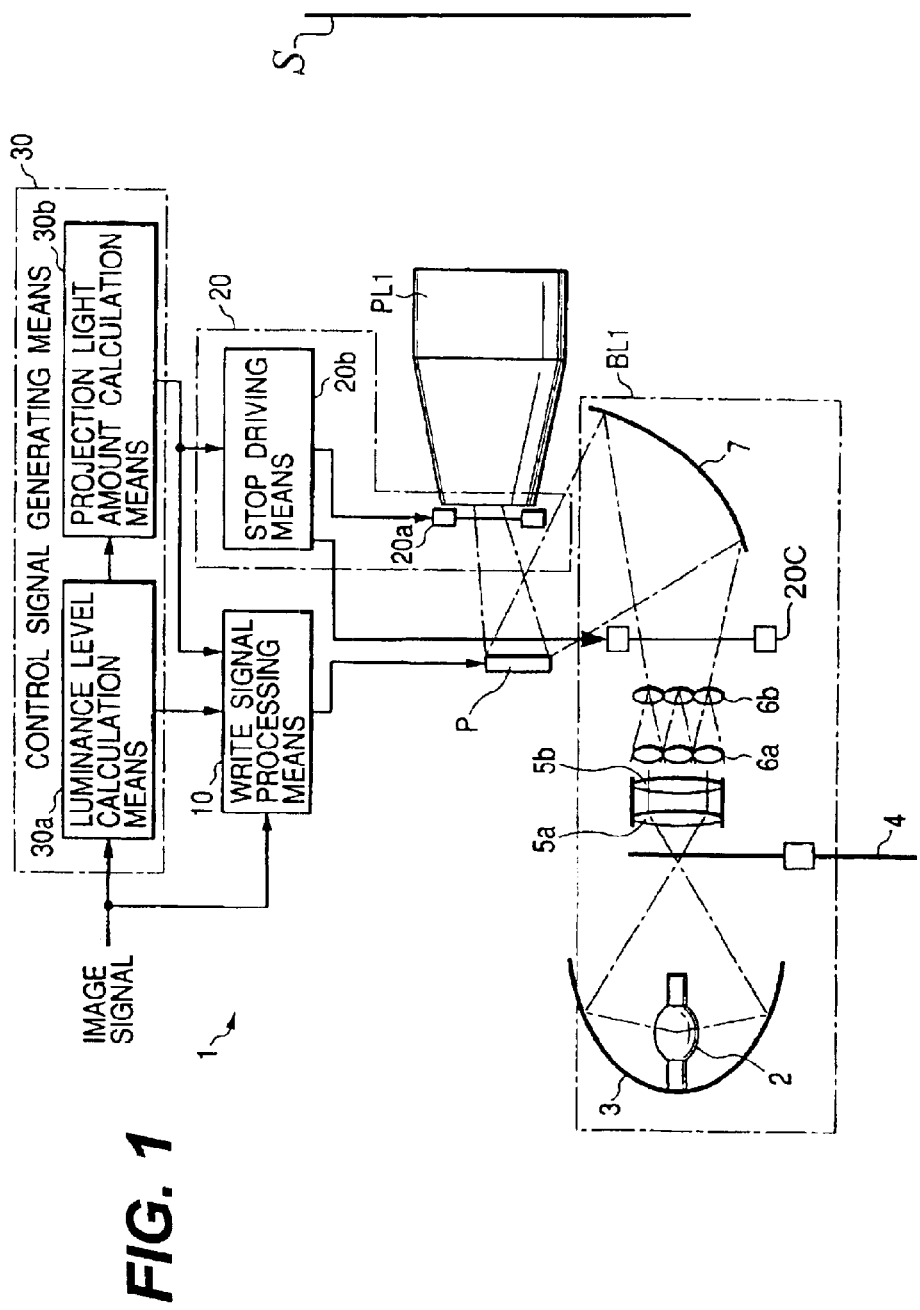
FIG. 1 shows the system construction of a liquid crystal projector according to an embodiment of the present invention.

An image display apparatus according to the present invention, as indicated reference numeral 1 in FIG. 1, includes a light modulating element P for controlling the state of the transmission or reflection of light to thereby display a gradation image, an illuminating optical system BL1 for applying light to the light modulating element P, and a projection optical system PL1 for projecting the transmitted light or reflected light of the light applied to the light modulating element P, and is designed to project this projection light onto a screen S to thereby display an image.

The image display apparatus further includes write signal processing means 10 for modulation-processing a write signal to the light modulating element, projection light amount control means 20 for controlling the amount of light transmitted through or reflected from the light modulating element, and control signal generating means 30 for controlling the write signal processing means 10 and the projection light amount control means 20.

The control signal generating means 30 may preferably generate a control signal so as to make the amount of projection light great and the modulation of the write signal small (attenuate the amount of the whole image light by light amount adjusting means and modulate the write signal to the display apparatus so that the dynamic range of luminance may widen) on the basis of the luminance level of an input image signal when the luminance level is high, and generate a control signal so as to make the amount of projection light small and the modulation of the write signal great (increase the amount of the whole image light by the light amount adjusting means and modulate the write signal to the display apparatus so as to reduce the dynamic range of luminance) when the luminance level is low.

The projection optical system PL1 in the present apparatus may preferably be comprised of a so-called schlieren optics (inverse schlieren). Also, the projection light amount control means 20 is comprised of movable stop means 20a, 20c and stop driving means 20b, and movable stop means 20a is disposed at the pupil position of the projection optical system PL1 which is a position not in conjugate relationship with the light modulating element P. Also, an integrator type illuminating optical system is used as the illuminating optical system BL1 in which movable stop means 20c is disposed, and a matrix-shaped light source image by an optical type integrator is formed at or near the position of the movable stop means 20a. As the optical type integrator, there is a kaleidoscope (also called a "rod type integrator") besides a fly-eye lens used in the present embodiment.

The projection light amount control means 20 may preferably control the aperture amount by opening or closing the movable stop means 20a in conformity with the luminance level of the input image signal.

Now, the above-described control signal generating means 30 is comprised of luminance level calculation means 30a for calculating the luminance level of the input image signal, and projection light amount calculation means 30b for calculating the amount of projection light emerging from the projection optical system in conformity with the calculated luminance level. The control signal generating means 30 may preferably generate a control signal for controlling the projection light amount control means 20 on the basis of the amount of projection light calculated in the projection light amount calculation means 30b, and generate a control signal for controlling the write signal processing means 10 on the basis of the luminance level calculated in the luminance level calculation means 30a and the calculated amount of projection light.

The luminance level calculation means 30a may preferably calculate the maximum value of the luminance signal of each pixel in each field or each frame of the input image signal as maximum luminance. In this case, the maximum value can be calculated by comparing the input image signal in a field or a frame in succession.

Figure 4A:
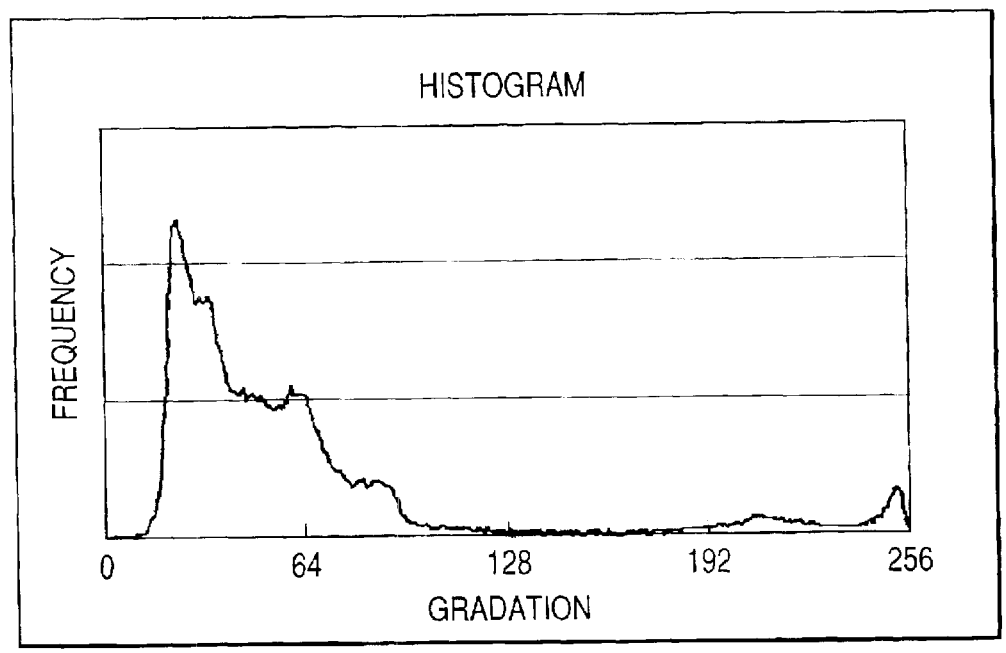
FIGS. 4A and 4B are histograms showing the luminance level distributions of an input image signal.
Figure 4B:
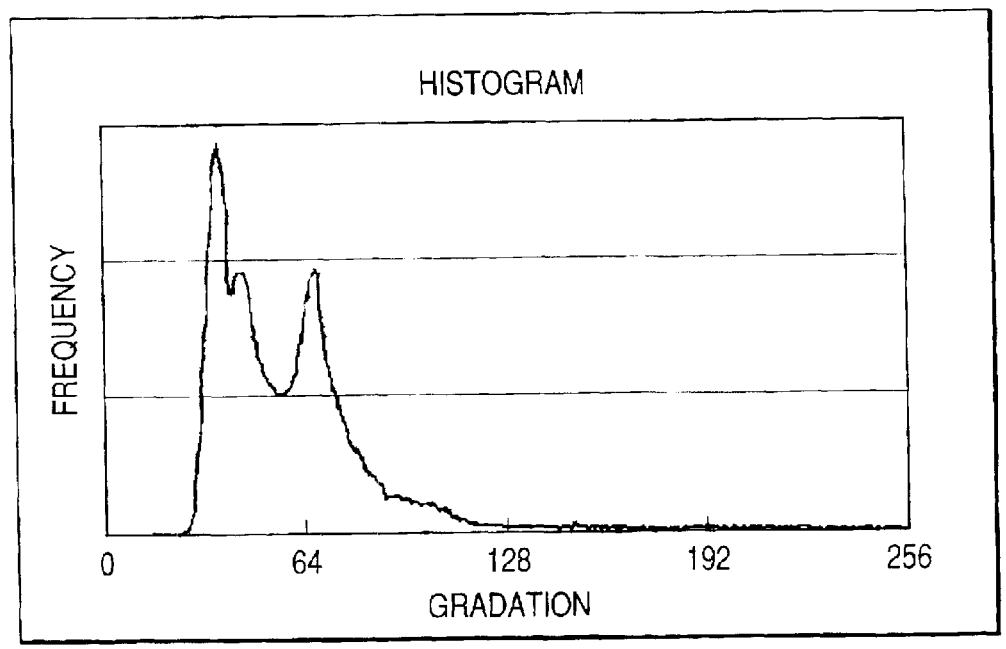
Figure 5A:
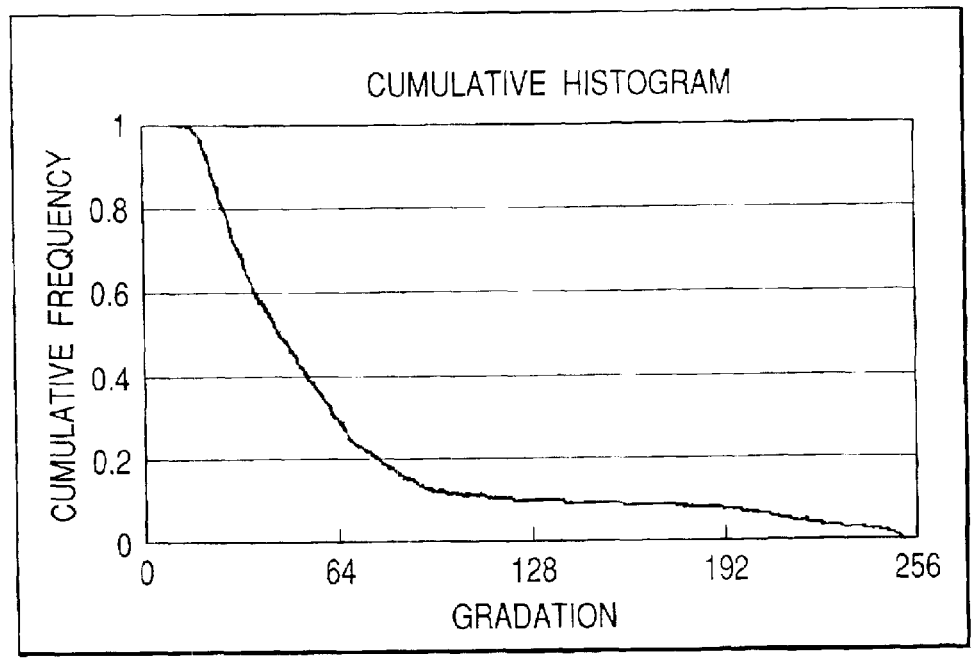
FIGS. 5A and 5B are cumulative histograms showing the luminance level distributions of the input image signal.
Figure 5B:
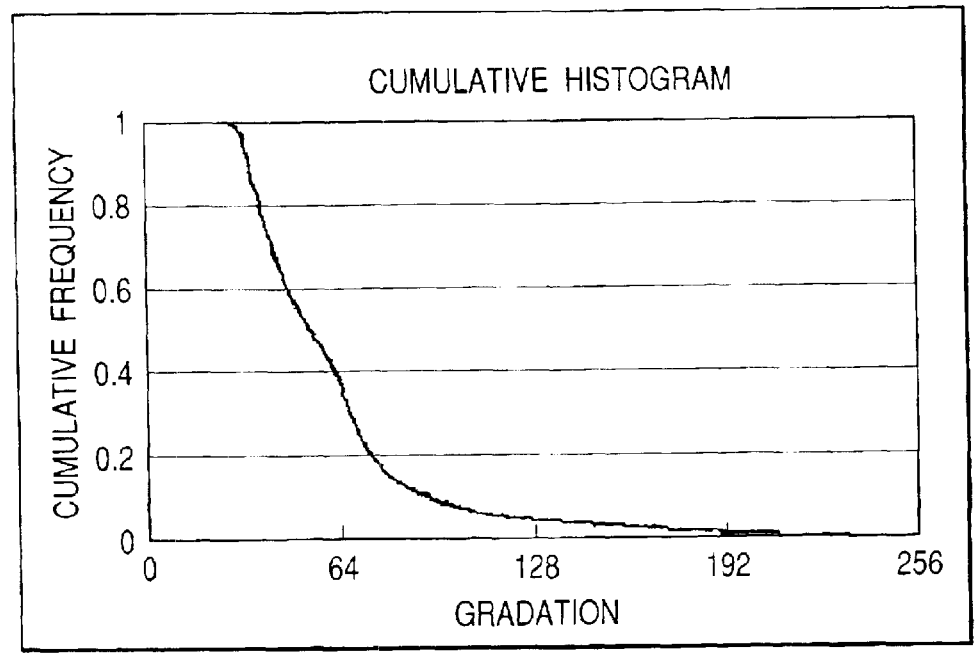

Alternatively, it may preferably calculate the cumulative histogram of the luminance signal of each pixel, and calculate a luminance level at which the cumulative histogram is constant or greater as maximum luminance. Here, if an image signal of which the luminance level in a field or a frame has a distribution shown in FIG. 4A or FIG. 4B is inputted, when the cumulative histogram is calculated from the higher luminance level, it becomes such as shown in FIG. 5A or FIG. 5B. The luminance level at which this cumulative histogram reaches e.g. 5% of the total image plane is calculated as maximum luminance. Accordingly, it is 216 in the example of FIG. 5A, and is 117 in the example of FIG. 5B. The control stages of the movable stop means 20a can be rendered into 255 stages in accord with the gradation of the input image, but practically may be rendered into the order of 8 to 16 stages. When the movable stop means is to be controlled at 8 stages, it is controlled at 7 of the 8 stages in the example of FIG. 5A, and at 4 of the 8 stages in the example of FIG. 5B, that is, so as to be 87.5% and 50%, respectively, of the maximum amount of light.

Also, the write signal processing means 10 may preferably modulate the write signal so as to amplify it at an amplification factor substantially inversely proportional to the aforementioned amount of projection light.

Now, as the light modulating element, mention can be made of an element using liquid crystal, MEMS (micro electromechanical systems) type element typified by the DMD of TI Co., or an element having a micromirror disposed therein. This light modulating element P may be of the transmission type or the reflection type.

Also, the movable stop means 20a is a stripe stop as shown in FIGS. 2A and 2B. By "stripe stop" is here meant a stop that has a plurality of light intercepting portions arranged in one direction with a given interval. The plurality of light intercepting portions are preferably a plurality of stop vanes explained in below, which have substantially rectangular shapes as shown in FIGS. 2A and 2B, and a plurality of stop vanes are arranged parallel with shorter sides of the rectangular shape thereof. The stopping operation is performed by the rotating operation on the rotary shafts of a plurality of stop vanes, and the stop driving means 20b is a cam motor or an ultrasonic motor for rotating the rotary shafts. Further, as shown in FIG. 3, in the movable stop means 20a, a plurality of strip-shaped stop vanes constituting the stripe stop are formed at such a pitch as accords with the arrangement of the unit images of the aforedescribed light source image.

The action of the present embodiment will now be described.

When a high luminance level (e.g. a maximum luminance level 255 on the assumption that the gradation of the input image signal is 8 bits) is now present in the input image signal, the dynamic range of the light modulating element P is all used and therefore is not subjected to the modulating process in the write signal processing means 10, and in the projection light amount control means 20, the movable stop means 20a is controlled so that the aperture thereof may become largest, and 100% of the light transmitted or reflected in the light modulating element P is used as projection light. At this time, unnecessary transmitted light or scattered light created by the light modulating element P emerges from the projection optical system PL1 through the aperture which has become largest, and black display floats. However, the human eyes relatively recognizes luminance with the maximum luminance in the image plane as the reference and therefore, when the luminance level of the display image plane is high, the float of black is not so conspicuous.

On the other hand, when the luminance level of the input image signal is low (e.g. a maximum luminance level 128 on the assumption that the gradation of the input image signal is 8 bits), the used dynamic range of the light modulating element P is about 50% and the amount of light required for projection is 50%. Accordingly, the projection light amount control means 20 controls the aperture of the movable stop means 20a so that the amount of projection light may become 50%. Further, in this state, the entire displayed image becomes a dark display and therefore, the light modulating element P is subjected to the modulating process so as to amplify the signal so that the dynamic range of the light modulating element P may be used by 100% in the write signal processing means 10. That is, the dynamic range of the light modulating element P is used by 100% and the display of the amount of projection light 50% is effected. The amount by which the amount of projection light has been thus stopped down by the projection light amount control means 20 is compensated for by the write signal processing means 10, whereby a display keeping the actual display luminance level constant becomes possible. At this time, the unnecessary transmitted light or scattered light created by the light modulating element P has its incidence onto the projection optical system PL1 suppressed by the aperture having become narrow. Accordingly, in this state, a display in which black is firm can be effected.

The effect of the present embodiment will now be described.

According to the present embodiment, when the amount of projection light is stopped down by the projection light amount control means 20, the incidence of the unnecessary scattered light from the light modulating element P onto the projection optical system PL1 is suppressed and a firmer black display can be effected. That is, the amount of projection light is controlled in conformity with the maximum luminance level of the input image signal and also, the write signal of the light modulating element P is subjected to the modulating process, whereby it becomes possible to improve the floating of black display without changing the display luminance level, and a display in which the display dynamic range is enlarged relative to the luminance of 100% displayed in terms of a maximum amount of light can be effected.

Also, when the luminance level of the displayed image is low, the input image signal is subjected to the modulating process and the image signal is expanded, whereby the gradation of the displayed image can be improved.

Also, in the present embodiment, as previously described, a plurality of stop vanes constituting the movable stop means 20a are formed in accord with the arrangement of the unit images of the light source image by the integrator, and the stop vanes are rotated to thereby uniformly intercept each unit image and therefore, even in the case of the amount of projection light being freely stopped down, a uniform brightness distribution image is always obtained, and the enlarged projection image of the dynamic range under such a uniform brightness distribution becomes possible.

The present invention will hereinafter be described in greater detail with respect to an embodiment thereof.
(Embodiment)

In the present embodiment, use is made of the projection type image display apparatus as shown in FIG. 1.

In the present embodiment, a reflection type DMD panel P is used as the light modulating element, the panel P is illuminated by the illuminating optical system BL1, a movable stop (movable stop means) 20a and the projection optical system PL1 are disposed in the named order on the side toward which the light is reflected by the panel P, and a screen S for image projection is disposed forwardly thereof.

Describing in greater detail, regarding the constituents of the illuminating optical system BL1, reference numeral 3 designates a reflector for a lamp, reference numeral 2 denotes a lamp (light emitting tube), reference numeral 4 designates a rotary color filter, reference characters 5a and 5b denote telecentric lenses, reference characters 6a and 6b designate fly-eye integrators, and reference numeral 7 denotes a condensing reflecting mirror. Also, the projection optical system PL1 is a so-called projection lens of a predetermined numerical aperture and a predetermined focal length (variable).

The light emitted from the lamp 2 is first reflected and condensed by the reflector 3 and passes through the rotary color filter 4 at a condensing point, whereby it is converted into a color light (RGB or RGBW) and thereafter comes to the lenses 5a and 5b in its widened state. It is made telecentric by the condensing action of the lenses 5a and 5b and is subjected to the ante-processing of the integrating action by the fly-eye integrators 6a and 6b and passes therethrough to the condensing and reflecting mirror 7, where it is reflected and condensed (by this condensing, the integrating action by the aforedescribed fly-eye integrators 6 is realized) and uniformly illuminates the DMD panel P. The DMD panel P reflects only the image light of the thus illuminating beam in a direction to pass through the movable stop means 20a by the modulating action of each pixel mirror, and the image light is enlarged and projected onto a screen S through the projection optical system PL1. At this time, the matrix-shaped light source image by the fly-eye integrators 6 is formed at or near the position of the movable stop means 20a. While the movable stop means 20a is disposed more adjacent to the projection optical system PL1 than to the DMD panel P, the movable stop means 20a can achieve a similar effect even if it is disposed more adjacent to the lamp 2 than to the DMD panel P. In that case, it is preferable to provide the movable stop means near the fly-eye integrators 6 or at a position conjugate with the fly-eye integrators 6.

Also, the movable stop means 20a, as shown in detail in FIGS. 2A and 2B, is a stripe stop in which a plurality of stop vanes perform the stopping operation by the rotating operation thereof on the rotary shafts thereof, and the stop driving means 20b comprises a cam motor or an ultrasonic motor for rotating the rotary shafts. Further, as shown in FIG. 3, strip-shaped stop vanes constituting the stripe stop are disposed at such a pitch as accords with the arrangement of the unit images of the afore-described light source image 60.

Also, in the present embodiment, a DMD panel is so-called RGB-sequentially driven, and this RGB sequential driving is synchronized with the rotation of the rotary color filter 4 so that a predetermined color light may illuminate the DMD panel.

The write signal processing circuit 10 is connected to the DMD panel P, and the control signal generating circuit 30 is connected to the write signal processing circuit 10 and the stop driving ultrasonic motor 20b. The control signal generating circuit 30 has already been described and therefore need not be described any further.

The action of the present embodiment will now be described.

Now, on the basis of the luminance level of the input image signal, the write signal to the movable stop means 20a and the DMD panel P is controlled so as to make the amount of projection light great and the modulation of the write signal small when the luminance level is high, and so as to make the amount of projection light small and the modulation of the write signal great when the luminance level is low.

Figure 6A:
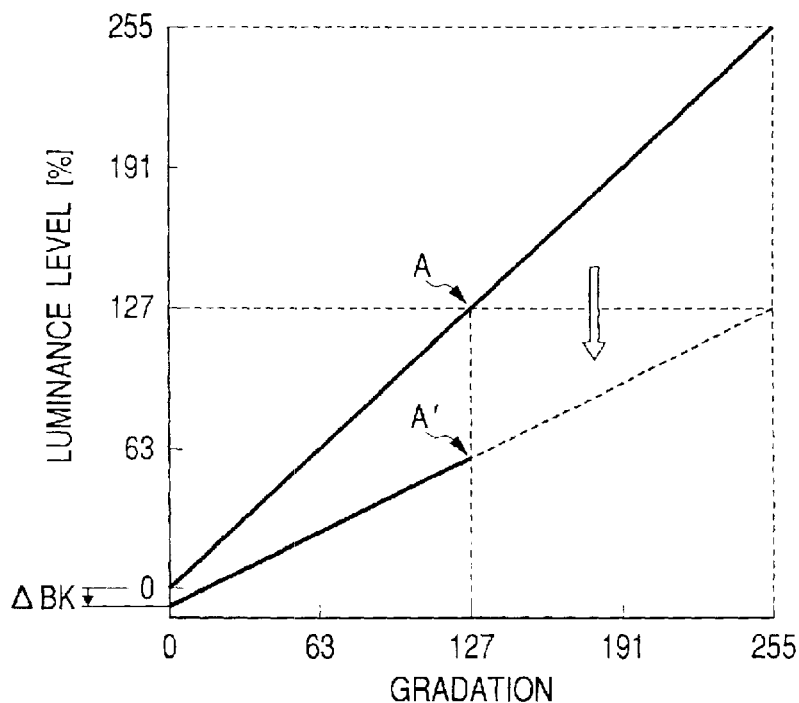
FIGS. 6A and 6B illustrate the modulation of a write signal into a light modulating element according to the embodiment of the present invention.
Figure 6B:
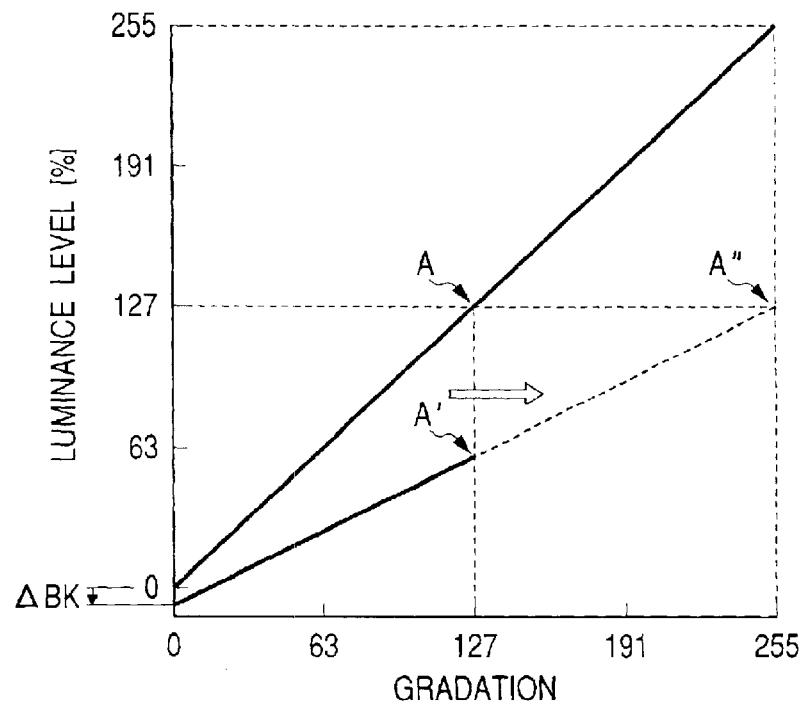

This operation will now be described with reference to FIGS. 6A and 6B. In FIGS. 6A and 6B, the luminance level on the axes of ordinates is such that luminance level relative to the gradation of the input image signal when 100% of the reflected light from the DMD was used with the stop fully opened is displayed at 8 bits. Here, however, for the simplification of description, it is to be understood that the luminance level linearly changes relative to the change in the gradation of the input image signal. When the maximum luminance level of the input image signal is calculated as 255, the stop is controlled so as to be fully opened in order to use 100% of the reflected light from the DMD, and the write signal is not subjected to modulation. Next, when the maximum luminance of the input image signal is calculated as 128, the utilization of the reflected light from the DMD may be 50%. Accordingly, the stop is adjusted so that the amount of projection light may become 50%. At this time, by the amount of projection light being adjusted to 50%, the luminance level of the displayed image uniformly becomes 50%. For example, when the gradation of the input image signal was 127, the luminance level was 127 (point A in FIGS. 6A and 6B), whereas the luminance level becomes about 64 (point A' in FIGS. 6A and 6B). So, in order to compensate for this, the input image signal is modulated. Specifically, it will suffice to bring the point A' in FIGS. 6A and 6B to a point A", and this can be accomplished by doubling the input image signal.

Now, by the amount of projection light being stopped, the zero luminance level (=blackdisplay) can be lowered as indicated by ΔBK in FIGS. 6A and 6B), as compared with a case where the amount of projection light is made great. That is, when the luminance level is low, the unnecessary scattered light from the DMD panel P is suppressed and a firmer black display is provided. Also, by the modulation of the write signal to the DMD panel P being effected in conformity with the control of the amount of projection light, compensation is done so as to keep the medium luminance level of the displayed image constant.

Also, regarding the quality, and particularly the uneven brightness, of the projection image, in the case of the present embodiment, as previously described, the stop vanes constituting the movable stripe stop 20a are disposed at such a pitch as accords with the arrangement of the unit images of the light source image 60 and therefore, when the stop vanes are rotated to thereby stop down the amount of projection light, the unit images are equally intercepted and therefore, there is no change in the number of the unit images by the stop amount, and a projection image of uniform brightness distribution is always obtained irrespective of the magnitude of the stop amount.

The effect of the present embodiment will now be described.

According to the present embodiment, when the maximum luminance level of the input image signal is low, a firmer black display can be effected without the medium luminance level of the displayed image being changed. Accordingly, a display in which the dynamic range is expanded becomes possible by the contrast with the white display when the maximum luminance level of the input image signal is high.

Also, the write signal to the DMD panel P is modulated so as to become great when the amount of projection light is controlled to a small amount, whereby it becomes possible to expand the gradational property of a low luminance level.

Further, it becomes possible to effect such expansion of the dynamic range and the gradational property always under a quality of image having a stable and uniform brightness distribution.

Now, while the present embodiment uses a vertical type movable stripe stop, this is not restrictive, but use can be made of any construction which equally stops down the unit images of the light source image (attenuates the amount of light), and for example, a horizontal type stripe stop, or an oblique stripe stop or a matrix-shaped one.

Also, in the above-described embodiment, the movable stripe stop is tiltable, but the numerical aperture thereof changes depending on the angle of the screen when the stop is tilted. Also, in the present invention, instead of the above-described movable stripe stop, use may be made of a variable stop in which a plurality of light intercepting plates variable in numerical aperture by being displaced by a control signal are arranged in the cross-section of the image light, a variable stop variable in aperture diameter by a control signal, or an ND filter variable in transmittance by a control signal.

Also, while in the present embodiment, the DMD panel is used as the display device, this is not restrictive, but a liquid crystal panel of the transmission type or the reflection type can entirely likewise be handled.

Further, while in the above-described embodiment, the projection light amount control means 20 adjusts the amount of light in the optical path from the panel P to the projection optical system PL1, this is not restrictive, but the projection light amount control means 20 may adjust the amount of light in the optical path between the fly-eye integrators 6 of the illuminating optical system BL1 to the panel P by driving, for example, movable stop means 20c, or the projection light amount control means 20 may adjust the amount of light in the optical path in the illuminating optical system BL1 and between the panel P to a screen S.

As described above, according to the present invention, when the maximum luminance calculated from the image display signal is small, control is effected so as to lower the amount of projection light and also raise the level of the write signal to the light modulating element, whereby a firm black display can be effected while the display luminance level is kept constant. Accordingly, a display in which the display dynamic range is expanded by the contrast between the white display when the amount of projection light is made maximum and the black display when the amount of projection light is lowered can be accomplished in a state in which a uniform brightness distribution is maintained.

Also, the gradation of the write signal of the light modulating element can be increased even at the same display luminance level and therefore, an improvement in the gradational property in a low luminance level display can be accomplished also in a state in which a uniform brightness distribution is maintained.

What is claimed is:

1. A projection type display apparatus comprising:

a display device;

an illuminating optical system which illuminates the display device with light from alight source, said illumination optical system having light amount adjusting means for adjusting, on the basis of an input signal to the display device, the amount of the light with which the display device is illuminated;

a projection optical system for projecting image light from the display device onto a surface to be projected, wherein said light amount adjusting means has a variable stop comprising a plurality of displaceable light intercepting plates.

2. An apparatus according to claim 1, wherein said light amount adjusting means has ND filter means variable in transmittance.

3. An apparatus according to claim 1, wherein said light amount adjusting means has a stop variable in aperture diameter.

4. An apparatus according to claim 1, wherein a write signal to said display device is modulated in synchronism with the adjustment of the amount of light by said light amount adjusting means so that the dynamic range about luminance may change.

5. A projection type display apparatus comprising:

a display device;

an illuminating optical system which illuminates the display device with light from a light source, said illumination optical system having light amount adjusting means for adjusting, on the basis of an input signal to the display device, the amount of the light with which the display device is illuminated;

a projection optical system for projecting image light from the display device onto a surface to be projected, wherein said light amount adjusting means has a variable stop comprising a plurality of tiltable light intercepting plates.

6. A projection type display apparatus comprising:

a display device;

an illuminating optical system which illuminates the display device with light from a light source;

a projection optical system for projecting image light from the display device onto a surface to be projected; and light amount adjusting means for adjusting the amount of the image light projected to the surface based on an input signal to the display device, wherein the light amount adjusting means has a variable stop including a plurality of tiltable light intercepting plates.

7. An apparatus according to claim 6, wherein the plurality of tiltable light intercepting plates are substantially same in shape.

8. A projection type display apparatus comprising:

a display device;

an illuminating optical system which illuminates the display device with light from a light source;

a projection optical system for projecting image light from the display device onto a surface to be projected; and light amount adjusting means for adjusting the amount of the image light projected to the surface based on an input signal to the display device, wherein the light amount adjusting means has a variable stop including a plurality of displaceable light intercepting plates.

9. An apparatus according to claim 8, wherein the plurality of displaceable light intercepting plates are substantially same in shape.

* * * * *